(No Model.)
A. G. COOK.
METHOD OF CONSTRUCTING OIL TROUGHS FOR TREE PROTECTORS.
No. 322,523. Patented July 21, 1885.
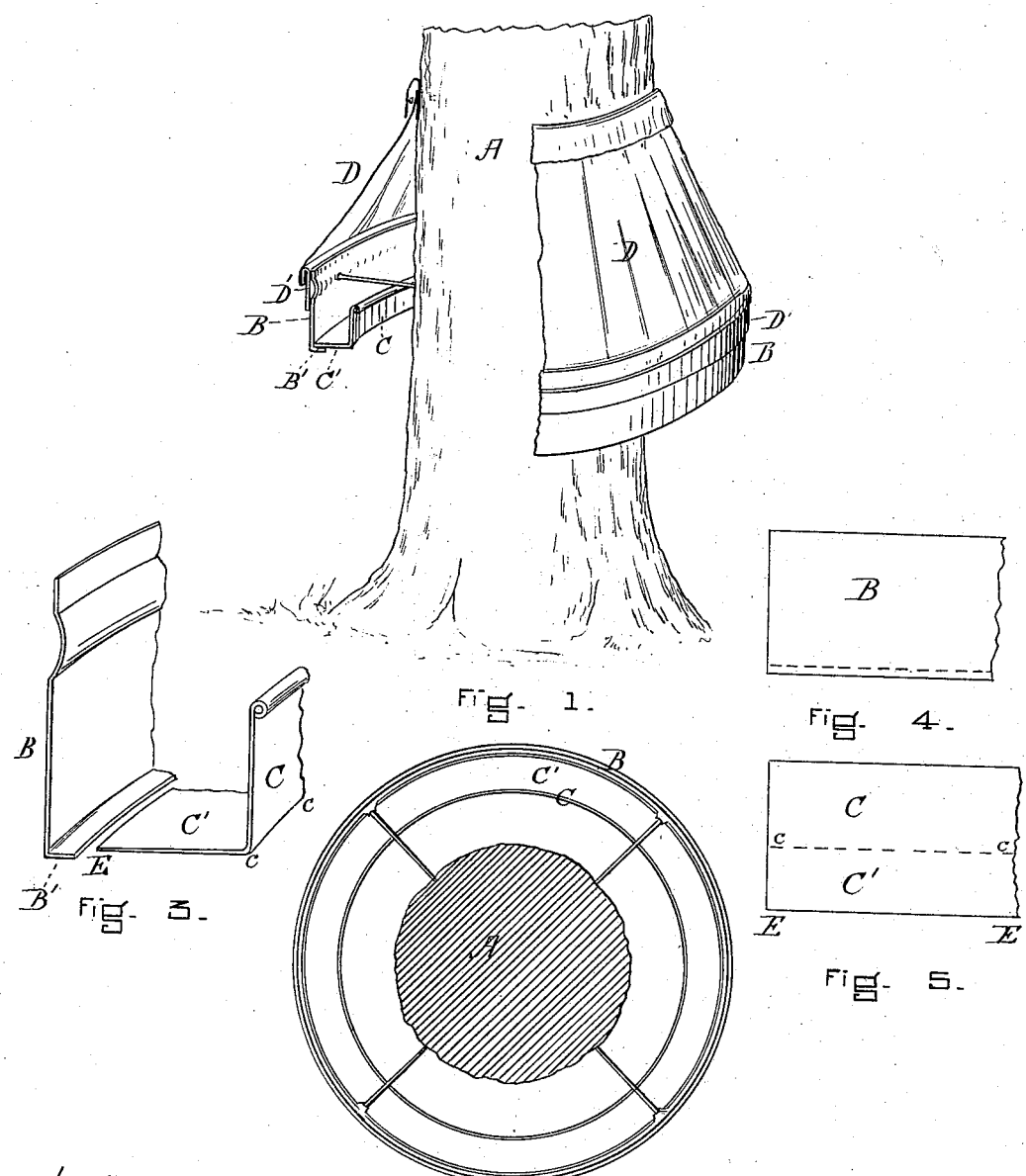
WITNESSES.
Frank G. Parker
William Edson
INVENTOR.
Albert G. Cook

UNITED STATES PATENT OFFICE.

ALBERT G. COOK, OF BOSTON, MASSACHUSETTS.

METHOD OF CONSTRUCTING OIL-TROUGHS FOR TREE-PROTECTORS.

SPECIFICATION forming part of Letters Patent No. 322,523, dated July 21, 1885.

Application filed April 2, 1885. (No model.)

*To all whom it may concern:*

Be it known that I, ALBERT G. COOK, of Boston, in the county of Suffolk and State of Massachusetts, have invented a new and useful Improvement in the Method of Making Oil-Troughs for Tree-Protectors, of which the following, taken in connection with the accompanying drawings, is a specification.

My invention relates to a method of constructing oil-troughs for tree-protectors without the use of corrugations. Corrugated troughs have been thoroughly tested and proved to be unreliable, from the fact that the corrugated parts are hard to reunite with the straight parts and be perfectly oil-tight; and where two or more parts are corrugated frequent breakages occur. I have also found in my practice that it is extremely difficult to clean out a corrugated trough. In fact, the objections are such that the use of a corrugated trough is abandoned.

My object is to save cutting the metal in curved pieces—that is, to use nothing but straight strips, so as to make no waste—also, to save soldering as much as possible, and at the same time to produce a cheap trough, smooth in all parts, rectangular in section, and curved to suit the tree. I obtain these objects by the mechanism shown in the accompanying drawings, in which—

Figure 1 represents a view, partly in section and partly in elevation, of one of my tree-protectors. Fig. 2 is a horizontal section indicating the manner of fastening the same to the tree. Fig. 3 is a perspective sketch showing the method of making the trough; and Figs. 4 and 5 are diagams to illustrate steps in my method.

A, Fig. 1, represents the trunk of the tree with one of my protectors attached. D is the cloth, which, together with the metal band D', forms the water-shed of the oil-trough B C C'.

The oil-trough proper, which is the subject of my invention, is made as follows: B, Figs. 1 and 3, is a strip of sheet metal in the form indicated at B, Fig. 4. The lower edge of this strip B is bent at right angles, as shown in Fig. 3, at B', so as to form a slight ledge. This piece B B' forms the outside wall of the protector, and may be readily curved to any desired diameter. The bottom of the trough and the inner wall are formed of a single piece of metal, which is first cut as a straight strip, as shown in Fig. 5. This strip is placed in a clamp and bent on the line $c\,c$, Fig. 5, so that the part C' is at right angles with the part C. The sheet is then placed so that the part C' is subject to the action of compression-rollers—that is, the part C' is rolled until it gradually decreases in thickness from its angle $c$ to its outer edge, E. This compression of the part C' will give a curvature that will adapt the plate to form the inner wall and bottom of the oil-trough. By compressing the part C' more or less I get the desired amount of curvature.

When the parts B C C' are completed as above described, they are soldered together by a single joint at B'. This completes the oil-trough, which is smooth in all of its parts and has but a single soldered joint.

Heretofore no smooth oil-trough has been made except by using metal for the bottom, which has to be cut in the form of a curve, thus making a great deal of work, as well as wasting a large percentage of material and requiring two soldered joints.

I claim—

The method of making an oil-trough for tree-protectors, consisting of the following steps: first, cutting a strip of sheet metal into a rectangular form; second, turning the lower edge of the same so as to form a narrow edge, B'; third, cutting a second piece of metal in a rectangular form and bending the same on line $c\,c$ running lengthwise, so as to form a right angle, the part C forming the inner wall of the trough and the part C' the bottom of the same; fourth, rolling the part C' so as to expand it sufficiently to give the required curve, and, fifth, joining the part C C' to the part B by a soldered joint, at B, substantially as described, and for the purpose set forth.

ALBERT G. COOK.

Witnesses:
FRANK G. PARKER,
WILLIAM EDSON.